United States Patent [19]

Oborin et al.

[11] 4,116,707
[45] Sep. 26, 1978

[54] RAW MIXTURE FOR PRODUCING REFRACTORY ALUMINOUS CEMENT

[76] Inventors: Pavel Alexandrovich Oborin, Chilanzar, kvartal 8, 34, kv. 44; Anatoly Yakovlevich Gadaev, kvartal TS-5, 41, kv. 24; Marsel Yanovich Bikbau, massiv Junus-Abad, B-2, 21, kv. 58; Boris Izrailovich Nudelman, Chilanzar, kvartal 8, 27, kv. 48; Irina Zelmanovna Aronova, kvartal TS-6, 96, kv. 18; Nail Yakubovich Bulatov, Chilanzar, kvartal 10, 19, kv. 31; Lev Matveevich Sosenko, Chilanzar, kvartal 23, 69, kv. 4, all of Tashkent, U.S.S.R.

[21] Appl. No.: 792,914

[22] Filed: May 2, 1977

[51] Int. Cl.² ............................................. C04B 7/32
[52] U.S. Cl. ................................................... 106/104
[58] Field of Search ......................... 106/104, 89, 100

[56] References Cited

U.S. PATENT DOCUMENTS 3,826,664   7/1974   Grylicki et al. ...................... 106/104
3,897,258   7/1975   Walter ................................. 106/104

Primary Examiner—J. Poer
Attorney, Agent, or Firm—Robert E. Burns; Emmanuel J. Lobato; Bruce L. Adams

[57] ABSTRACT

A raw mixture for the production of a refractory aluminous cement which consists of a basic component comprising barium carbonate or strontium carbonate, an acidic component comprising alumina or a mixture of alumina with zirconia, and chloride of at least one of the following metals: barium, strontium, sodium or potassium. The mixture according to the present invention makes it possible to reduce energy consumption for the production of cement by 30 to 35%, lower the calcination temperature by 300° to 500° C and to improve the quality of cement.

6 Claims, No Drawings

RAW MIXTURE FOR PRODUCING REFRACTORY ALUMINOUS CEMENT

BACKGROUND OF THE INVENTION

The present invention relates to the production of cement and, more specifically, to a raw mixture for the production of a refractory aluminous cement intended for the manufacture of refractory materials.

Known in the art are raw mixtures for the production of a refractory aluminous cement containing commercial alumina, barium or strontium carbonates or sulphates.

To obtain a refractory aluminous cement, said raw mixtures are calcined at a temperature within the range of from 1,500° to 1,600° C which is associated with considerable energy consumption and the necessity of using calcination furnaces with a highly-refractory lining.

Also known in the art is a raw mixture for the production of a refractory aluminous barium-zirconium cement containing, as the principal component, barium carbonate, while as the acidic component use is made of commercial alumina and zirconia.

Cement produced from said raw mixture features a high and highest refractoriness (up to the temperature of 2,500° C). However, to produce such cement, the raw mixture is calcined at a temperature within the range of from 1,600° to 1,650° C which is also associated with considerable energy consumption and the necessity of using calcination furnaces provided with a special refractory lining.

SUMMARY OF THE INVENTION

It is a principal object of the present invention to reduce energy consumption and the calcination temperature of the raw mixture.

It is another object of the present invention to improve the quality of the product produced from the raw mixture due to a higher purity thereof obtained during the calcination.

It is a further object of the present invention to minimize currently employed limitations as to the purity of the raw materials employed.

Still another object of the present invention is to provide for the use of thermal units with a general refractory lining.

These and other objects of the present invention are accomplished by a raw mixture for the production of a refractory aluminous cement which mixture contains as a basic component barium carbonate or strontium carbonate and as an acidic component — alumina or a mixture of alumina with zirconia; in accordance with the present invention, the raw mixture also contains a chloride of at least one of the following metals: barium, strontium, sodium, potassium; said components being contained in the following proportions, percent by mass:

| | |
|---|---|
| barium carbonate or strontium carbonate | 40 to 62 |
| chlorides of said metals | 5 to 20 |
| alumina or a mixture of alumina and zirconia at a ratio of from 1 : 14 to 5 : 1 respectively | the balance |

The raw mixture according to the present invention makes it possible to reduce energy consumption for the production of cement by 30 to 35% and calcination temperature — by 300° to 500° C.

DESCRIPTION OF THE INVENTION

To obtain a strontium-zirconium aluminous cement of a highest refractoriness (i.e. at a temperature of from 2,250° to 2,500° C), it is advisable to make use of a raw mixture consisting of the following components, percent by mass:

| | |
|---|---|
| strontium carbonate | 40 to 56 |
| zirconia | 36 to 29 |
| alumina | 4 to 10 |
| chlorides of said metals | 20 to 5 |

To obtain barium-alumina cement with a refractoriness within the range of from 1,720° to 1,830° C, it is advisable to make use of a raw mixture consisting of the following components, percent by mass:

| | |
|---|---|
| barium carbonate | 50 to 60 |
| alumina | 30 to 35 |
| chlorides of said metals | 20 to 5 |

In order to obtain a barium-zirconium aluminous cement with a refractoriness within the range of from 1,850° to 2,300° C, it is advisable to make use of a raw mixture consisting of the following components, percent by mass:

| | |
|---|---|
| barium carbonate | 50 to 62 |
| zirconia | 5 to 22 |
| alumina | 25 to 11 |
| chlorides of said metals | 20 to 5 |

In order to obtain a barium-zirconium aluminous cement of a highest refractiveness (2,300° to 2,500° C), it is advisable to make use of a raw mixture consisting of the following components, percent by mass:

| | |
|---|---|
| barium carbonate | 40 to 62 |
| zirconia | 37.3 to 22 |
| alumina | 2.7 to 11 |
| chlorides of said metals | 20 to 5 |

The method of preparation of the raw mixture according to the present invention is effected in the following manner. The starting components are disintegrated together or separately, followed by intermixing thereof.

Disintegration and intermixing of the starting components taken in appropriate amounts is performed either by dry method, wherein all the components are placed into a milling unit in a dry state together or separately, or by wet method, i.e. with addition of 25 - 35% by mass of water or an aqueous solution of the chlorides employed to obtain a slurry of raw materials. To prepare a granulated material, a dry mixture is added with 6 to 9% mass of water or an aqueous solution of chlorides.

The above-mentioned proportions of the components in a mixture are selected on the basis of the content of monoaluminates and/or monozirconates of barium and strontium in the final product which content is responsible for the cement properties.

The amount of chlorides is defined by required proportions of the above-mentioned minerals and technology of calcination of the raw mixture. For example, in the case of the calcination temperature range of from 1,000° to 1,100° C, a greater amount of chlorides is employed (15 to 20% by mass), while within the temperature range of from 1,200° to 1,300° C the amount of chlorides is 5 to 10% by mass.

The presence of said chlorides in the raw mixture facilitates the formation of a liquid phase, serving as a reaction medium, even at a temperature within the range of from 900° to 1,000° C. In the presence of said reaction medium comprising salt melts of chlorides of barium, strontium, potassium and sodium, processes of decarbonization of barium and strontium carbonates are substantially intensified along with acceleration of dissolution of oxides of the starting components and processes of crystallization of the above-mentioned cement materials.

Metered and homogenized dry raw mixture or granulated material or slurry is fed into a thermal unit, wherein the material is calcined at a temperature within the range of from 1,000° to 1,300° C.

The resulting clinker can contain a required amount of residual chlorides. Clinker is cooled after calcination and ground to a required fineness of particles for the production of cement.

An advantage of the present invention resides in intensification of the clinker-formation process with simultaneous decrease of energy consumption by 30 to 35% and lowered calcination temperature down to 1,000° to 1,300° C along with reduction of a specific rate of fuel consumption or electric energy.

The present invention makes it possible to improve the final product quality (to increase its refractiveness and activity) due to increased purity thereof.

The chlorides-containing raw mixture makes it possible to produce a refractory aluminous cement in furnaces with a commonly used lining and to minimize existing limitations imposed on purity of the starting materials employed.

For a better understanding of the present invention some specific examples are given hereinbelow by way of illustration.

EXAMPLE 1

A raw mixture is prepared for the production of a strontium-zirconium aluminous cement having the following composition, percent by mass:

| | |
|---|---|
| strontium carbonate | 40 |
| zirconia | 36 |
| alumina | 4 |
| barium chloride | 20. |

Commercial alumina is disintegrated by wet grinding to a residue of not more than 10% by mass on a sieve with holes of 63 mcm. To facilitate grinding of alumina, 30% by mass of water are added thereto. Into the resulting aluminous slurry barium chloride is added in the ratio (to the mass of alumina) of 1:5 with addition of water to ensure total humidity of the barium-alumina slurry of 30%. Said slurry is intermixed with a strontium-zirconium slurry prepared by a combined wet grinding of strontium carbonate and zirconia with 32% by mass of water.

The resulting raw mixture is air-dried and granulated to particles with a size of from 5 to 10 mm.

The granulated material is calcined at a temperature within the range from 1,000° to 1,100° C to complete the clinker-formation process which is controlled by the absence of non-combined SrO and BaO.

The resulting clinker contains 50 to 55% by mass of strontium monozirconate, 20 to 25% by mass of barium monozirconate and 15 to 20% by mass of strontium and barium monoaluminates.

The clinker is disintegrated to a fineness degree corresponding to the residue of 10% by mass on a sieve with holes of 80 mcm diameter.

The resulting cement has the following properties:

| compression strength, kgf/cm$^2$: | |
|---|---|
| after 3 days | 24.5 |
| after 7 days | 280 |
| after 28 days | 340 |
| refractoriness, ° C | 2,290. |

EXAMPLE 2

A raw mixture is prepared for the production of a strontium-zirconium aluminous cement having the following composition, percent by mass:

| | |
|---|---|
| strontium carbonate | 56 |
| zirconia | 29 |
| alumina | 10 |
| strontium chloride | 5. |

Commercial alumina is crushed to a residue of not more than 8% by mass on a sieve with holes of 10 mcm diameter. In a similar manner disintegrated are strontium carbonate, zirconia and strontium chloride. The thus prepared raw flour is calcined in a fluidized bed at a temperature within the range of from 1,100° to 1,200° C. The resulting clinker is cooled and disintegrated to a residue of 7% by mass on a sieve with holes of 80 mcm.

The thus-produced cement contains 65 to 70% by mass of strontium monozirconate and 30 to 35% by mass of strontium monoaluminate. Free SrO is absent.

The final cement has the following properties:

| compression strength, kgf/cm$^2$: | |
|---|---|
| after 3 days | 290 |
| after 7 days | 325 |
| after 28 days | 410 |
| refractoriness, ° C | 2,240. |

EXAMPLE 3

A raw mixture is prepared for the production of a strontium-zirconium aluminous cement having the following composition, percent by mass:

| | |
|---|---|
| strontium carbonate | 48 |
| zirconia | 33 |
| alumina | 7 |
| barium chloride | 8 |
| strontium chloride | 4. |

From these components a raw slurry is prepared in a manner similar to that described in Example 1 hereinbefore.

The granulated material is calcined at a temperature within the range of from 1,200° to 1,300° C until the clinker-formation process is completed.

The thus-produced clinker contains 70 to 75% by mass of strontium monozirconate, 25 to 30% by mass of strontium monoaluminate and 5 to 7% by mass of barium monoaluminate.

The clinker is disintegrated to a residue of 10% by mass on a sieve with holes of 80 mcm diameter.

The thus-produced cement has the following properties:

| compression strength, kfg/cm$^2$: | |
|---|---|
| after 3 days | 260 |
| after 7 days | 305 |
| after 28 days | 325 |
| refractoriness, °C | 2,430. |

EXAMPLE 4

A raw mixture is prepared for the production of a strontium-zirconium aluminous cement having the following composition, percent by mass:

| strontium carbonate | 40 |
|---|---|
| zirconia | 36 |
| alumina | 4 |
| strontium chloride | 10 |
| potassium chloride | 8 |
| sodium chloride | 2. |

From these components a raw slurry is prepared in a manner similar to that described in Example 1 hereinbefore.

The granulated material is calcined at a temperature within the range of from 1,200° to 1,300° C until the clinker-formation process is completed.

The thus-obtained clinker contains 65 to 70% by mass of strontium monozirconate and 30 to 35% by mass of strontium monoaluminate.

The clinker is disintegrated to a residue of 10% by mass on a sieve with holes of 10 mcm diameter. The final cement has the following properties:

| compression strength, kgf/cm$^2$: | |
|---|---|
| after 3 days | 230 |
| after 7 days | 265 |
| after 28 days | 315 |
| refractoriness, °C | 2,500. |

EXAMPLE 5

A raw mixture is prepared for the production of a strontium-zirconium aluminous cement having the following composition, percent by mass:

| strontium carbonate | 44 |
|---|---|
| zirconia | 32 |
| corundum (calculated for alumina) | 9 |
| barium chloride | 3 |
| strontium chloride | 9 |
| potassium chloride | 2 |
| sodium chloride | 1. |

Corundum powder with a particle size of below 90 mcm is mixed with the above-listed components in a manner similar to that described in the foregoing Example 2.

The resulting raw flour is calcined in a fludized bed at a temperature within the range of from 1,150° to 1,250° C to complete the clinker-formation process. The resulting clinker contains 65 to 70% by mass of strontium monozirconate, 30 to 35% by mass of strontium monoaluminate.

The clinker is disintegrated to a residue of 10% by mass on a sieve with holes of a 80 mcm diameter.

The thus-produces cement has the following properties:

| compression strength, kgf/cm$^2$: | |
|---|---|
| after 3 days | 275 |
| after 7 days | 320 |
| after 28 days | 360 |
| refractoriness, °C | 2,400. |

EXAMPLE 6

A raw mixture is prepared for the production of a strontium-zirconium aluminous cement having the following composition, percent by mass:

| strontium carbonate | 41 |
|---|---|
| zirconia | 31 |
| alumina | 8 |
| potassium chloride | 20 |

A raw flour is prepared in a manner similar to that described in Example 2 hereinbefore. The resulting raw flour is calcined in a fluidized bed ad a temperature within the range of from 1,150° to 1,200° C till the clinker-formation process is completed. The clinker contains 70 to 75% by mass of strontium monozirconate, 25 to 30% by mass of strontium monoaluminate.

The clinker is disintegrated to a residue of 10% by mass on sieve with holes of a 80 mcm diameter. The thus-produced cement has the following properties:

| compression strength, kgf/cm$^2$: | |
|---|---|
| after 3 days | 255 |
| after 7 days | 310 |
| after 28 days | 330 |
| refractoriness, °C | 2,310. |

EXAMPLE 7

A raw mixture is prepared for the production of a strontium-zirconium aluminous cement having the following composition, percent by mass:

| strontium carbonate | 41 |
|---|---|
| zirconia | 29 |
| alumina | 10 |
| potassium chloride | 5 |
| sodium chloride | 15. |

A raw mixture is prepared in a manner similar to that of Example 2 hereinbefore. The resulting raw flour is calcined in a fluidized bed at a temperature within the range of from 1,200° to 1,250° C until the clinker-formation process is completed. The clinker contains 60 to 65% by mass of strontium monozirconate and 35 to 40% by mass of strontium monoaluminate.

The clinker is disintegrated to a residue of 10% by mass on a sieve with holes of 80 mcm diameter. The thus-produced cement has the following properties:

| compression strength, kgf/cm$^2$: | |
|---|---|
| after 3 days | 265 |
| after 7 days | 310 |
| after 28 days | 335 |

-continued

| compression strength, kgf/cm²: | |
|---|---|
| refractoriness, ° C | 2,300. |

EXAMPLE 8

A raw mixture is prepared for the production of a barium-alumina cement having the following composition, percent by mass:

| | |
|---|---|
| barium carbonate | 50 |
| alumina | 30 |
| barium chloride dihydrate (calculated for barium chloride) | 20. |

Commercial alumina is crushed by wet grinding to a residue of not more than 10% by mass on a sieve with holes of a 63 mcm diameter. To facilitate the grinding, 30% by mass of water are added to alumina. Into the resulting alumina slurry barium chloride dihydrate is added in the ratio of 2:3 to the alumina mass (as calculated for $BaCl_2$). This slurry is intermixed with a barium slurry also prepared by wet grinding.

The resulting raw mixture is air-dried and granulated to particles with a size of from 5 to 10 mm.

The granulated material is calcined at a temperature within the range of from 1,050° to 1,150° C to complete the clinker-formation process which is controlled by the absence of non-combined BaO. The thus-produced clinker is cooled. It comprises barium monoaluminate. The clinker is disintegrated to a residue of 10% by mass on a sieve with holes of a 63 mcm diameter. The resulting cement has the following properties:

| compression strength, kfg/cm²: | |
|---|---|
| after 1 day | 310 |
| after 3 days | 390 |
| after 7 days | 490 |
| after 28 days | 510 |
| refractoriness, ° C | 1,830. |

EXAMPLE 9

A raw mixture is prepared for the production of a barium-alumina cement having the following composition, percent by mass:

| | |
|---|---|
| barium carbonate | 58 |
| alumina | 32 |
| potassium chloride | 1 |
| barium chloride | 8 |
| sodium chloride | 1. |

The mixture is prepared by wet grinding in a manner similar to that described in the foregoing Example 8. The resulting granulated material is calcined at a temperature within the range of from 1,100° to 1,200° C to complete the clinker-formation process which is controlled by the absence of non-combined BaO. The resulting clinker comprising barium monoaluminate is cooled and then disintegrated to a residue of 10% by mass on a sieve with holes of a 63 mcm diameter.

The resulting cement has the following properties:

| compression strength, kfg/cm²: | |
|---|---|
| after 1 day | 295 |
| after 3 days | 355 |
| after 7 days | 460 |
| after 28 days | 490 |
| refractoriness, ° C | 1,820 |

EXAMPLE 10

A raw mixture is prepared for the production of a barium-alumina cement having the following composition, percent by mass:

| | |
|---|---|
| barium carbonate | 60 |
| alumina | 35 |
| barium chloride | 4 |
| sodium chloride | 1. |

The mixture is prepared by wet grinding in a manner similar to that described in Example 1 hereinbefore.

The resulting granulated material is calcined at a temperature within the range of from 1,200° to 1,250° C to complete the clinker-formation process which is controlled by the absence of non-combined BaO.

The thus-produced clinker comprising barium monoaluminate is cooled and then crushed to a residue of 10% by mass on a sieve with holes of a 63 mcm diameter.

The final cement has the following properties:

| compression strength, kgf/cm²: | |
|---|---|
| after 1 day | 305 |
| after 3 days | 335 |
| after 7 days | 460 |
| after 28 | 485 |
| refractoriness, ° C | 1,830. |

EXAMPLE 11

A raw mixture is prepared for the production of a barium-alumina cement having the following composition, percent by mass:

| | |
|---|---|
| barium carbonate | 53 |
| alumina | 34 |
| strontium chloride | 10 |
| potassium chloride | 3. |

The mixture is prepared by wet grinding in a manner similar to that described in the foregoing Example 8.

The resulting granulated material is calcined at a temperature within the range of from 1,100° to 1,200° C to complete the clinker-formation process, controlled by the absence of non-combined BaO.

The thus-produced clinker comprising mainly barium monoaluminate with a content of from 10 to 15% by mass of strontium monoaluminate is cooled and then crushed to a residue of 10% by mass on a sieve with holes of 63 mcm.

The final cement has the following properties:

| compression strength, kgf/cm²: | |
|---|---|
| after 1 day | 310 |
| after 3 days | 390 |
| after 7 days | 445 |
| after 28 days | 470 |
| refractoriness, ° C | 1,760. |

EXAMPLE 12

A raw mixture is prepared for the production of a barium-zirconium aluminous cement having the following composition, percent by mass:

| | |
|---|---|
| barium carbonate | 50 |
| zirconia | 5 |
| alumina | 25 |
| barium chloride | 20. |

The mixture is prepared by wet grinding in a manner similar to that described in Example 1 hereinbefore.

The resulting granulated material is calcined at a temperature within the range of from 1,000° to 1,100° C until the clinker-formation process is completed which is controlled by the absence of non-combined BaO. The thus-produced clinker consists of 75 to 80% by mass of barium monoaluminate and 15 to 20% by mass of barium monozirconate. The clinker is ground to a residue of 10% by mass on a sieve with holes of 63 mcm.

The final cement has the following properties:

| | |
|---|---|
| compression strength, kgf/cm$^2$: | |
| after 3 days | 590 |
| after 7 days | 830 |
| after 28 days | 890 |
| refractoriness, ° C | 1,890. |

EXAMPLE 13

A raw mixture is prepared for the production of a barium-zirconium aluminous cement having the following composition, percent by mass:

| | |
|---|---|
| barium carbonate | 62 |
| zirconia | 22 |
| alumina | 11 |
| strontium chloride | 5. |

The mixture is prepared by wet grinding in a manner similar to that of Example 1 hereinbefore.

The resulting granulated material is calcined at a temperature within the range of from 1,200° to 1,250° C until the clinker-formation process is completed which is controlled by the absence of non-combined BaO and SrO. The thus-produced clinker consists of 30 to 35% by mass of barium monoaluminate and 65 to 70% by mass of barium monozirconate. The clinker is ground to a residue of 10% by mass on a sieve with holes of 63 mcm. The final cement has the following properties:

| | |
|---|---|
| compression strength, kgf/cm$^2$: | |
| after 3 days | 410 |
| after 7 days | 490 |
| after 28 days | 560 |
| refractoriness, ° C | 2,280. |

EXAMPLE 14

A raw mixture is prepared for the production of a barium-zirconium aluminous cement having the following composition, percent by mass:

| | |
|---|---|
| barium carbonate | 56 |
| zirconia | 14 |
| alumina | 17 |
| barium chloride | 10 |
| potassium chloride | 2 |
| sodium chloride | 1. |

The mixture is prepared by wet grinding as in Example 1 and calcined at a temperature within the range of from 1,100° to 1,200° C until the clinker-formation process is completed which is controlled by the absence of non-combined BaO. The resulting clinker consists of 35 to 40% by mass of barium monozirconate and 60 to 65% by mass of barium monoaluminate. The clinker is crushed to a residue of 10% by mass on a sieve with holes of a 63 mcm diameter. The final cement has the following properties:

| | |
|---|---|
| compression strength, kgf/cm$^2$: | |
| after 3 days | 450 |
| after 7 days | 610 |
| after 28 days | 720 |
| refractoriness, ° C | 2,050. |

EXAMPLE 15

A raw mixture is prepared for the production of barium-zirconium aluminous cement having the following composition, percent by mass:

| | |
|---|---|
| barium carbonate | 40 |
| zirconia | 37.3 |
| alumina | 2.7 |
| barium chloride | 15 |
| potassium chloride | 5 |

The mixture is prepared by the procedure described in Example 2 hereinbefore. The resulting raw flour is calcined in a fluidized bed at a temperature within the range of from 1,150° to 1,250° C. The resulting clinker contains 5 to 7% by mass of barium monoaluminate, the balance being represented by barium monozirconate.

The clinker is ground to a residue of 10% by mass on a sieve with a hole diameter of 63 mcm.

The final cement has the following properties:

| | |
|---|---|
| compression strength, kgf/cm$^2$: | |
| after 3 days | 155 |
| after 7 days | 270 |
| after 28 days | 340 |
| refractoriness, ° C | 2,500. |

EXAMPLE 16

A raw mixture is prepared for the production of a barium-zirconium aluminous cement having the following composition, percent by mass:

| | |
|---|---|
| barium carbonate | 62 |
| zirconia | 22 |
| alumina | 11 |
| barium chloride | 5. |

The mixture is prepared in a manner similar to that described in Example 2 hereinbefore. The resulting raw flour is calcined in a fluidized bed at a temperature within the range of from 1,250° to 1,300° C. The thus-produced clinker consists of 60 to 65% by mass of barium monozirconate and 35 to 40% by mass of barium monoaluminate.

The clinker is ground to a residue of 10% by mass on a sieve with a hole diameter of 63 mcm.

The final cement had the following properties:

| compression strength, kgf/cm²: | |
|---|---|
| after 3 days | 380 |
| after 7 days | 495 |
| after 28 days | 540 |
| refractoriness, °C | 2,390° C. |

EXAMPLE 17

A raw mixture is prepared for the production of a barium-zirconium aluminous cement having the following composition, percent by mass:

| | |
|---|---|
| barium carbonate | 50 |
| zirconia | 30 |
| alumina | 7 |
| barium chloride | 8 |
| strontium chloride | 2 |
| potassium chloride | 2 |
| sodium chloride | 1. |

The mixture is prepared in a manner similar to that of Example 2. The resulting raw flour is calcined in a fluidized bed at a temperature within the range of from 1,200° to 1,250° C. The resulting clinker consists of 70 to 75% by mass of barium monozirconate and 25 to 30% by mass of barium monoaluminate.

The clinker is ground to a residue of 10% by mass on a sieve with a hole diameter of 63 mcm.

The thus-produced cement has the following properties:

| compression strength, kgf/cm²: | |
|---|---|
| after 3 days | 320 |
| after 7 days | 445 |
| after 28 days | 500 |
| refractoriness, °C | 2,410. |

What is claimed is:

1. A raw mixture for the production of a refractory aluminous cement consisting of a basic component selected from the group consisting of barium carbonate and strontium carbonate, an acidic component selected from the group consisting of alumina and a mixture of alumina with zirconia in a ratio of from 1:14 to 5:1 respectively, and a chloride of at least one of the metals selected from the group consisting of barium, strontium, sodium, potassium; said components being contained in the following proportions percent by mass:

| | |
|---|---|
| basic component | 40 to 62 |
| chlorides of said metals | 5 to 20 |
| acidic component | the balance. |

2. A raw mixture as claimed in claim 1, consisting of the following components, percent by mass:

| | |
|---|---|
| strontium carbonate | 40 to 56 |
| zirconia | 36 to 29 |
| alumina | 4 to 10 |
| chlorides of said metals | 20 to 5. |

3. A raw mixture as claimed in claim 1, consisting of the following components, percent by mass:

| | |
|---|---|
| barium carbonate | 50 to 60 |
| alumina | 30 to 35 |
| chlorides of said metals | 20 to 5. |

4. A raw mixture as claimed in claim 1, consisting of the following components, percent by mass:

| | |
|---|---|
| barium carbonate | 50 to 62 |
| zirconia | 5 to 22 |
| alumina | 25 to 11 |
| chlorides of said metals | 20 to 5. |

5. A raw mixture as claimed claim 1, consisting of the following components, percent by mass:

| | |
|---|---|
| barium carbonate | 40 to 62 |
| zirconia | 37.3 to 22 |
| alumina | 2.7 to 11 |
| chlorides of said metals | 20 to 5. |

6. A method for producing a refractory aluminous cement which comprises calcining the raw mixture defined in claim 1 at a temperature of about 1000° to 1300° C.

* * * * *